(12) United States Patent
Stehle

(10) Patent No.: US 9,587,472 B2
(45) Date of Patent: Mar. 7, 2017

(54) PROCESS FOR PRODUCING NATURAL GAS AND NATURAL GAS CONDENSATE FROM UNDERGROUND GAS CONDENSATE DEPOSITS

(71) Applicant: Wintershall Holding GmbH, Kassel (DE)

(72) Inventor: Vladimir Stehle, Kassel (DE)

(73) Assignee: Wintershall Holding GmbH (DE)

( * ) Notice: Subject to any disclaimer, the term of this patent is extended or adjusted under 35 U.S.C. 154(b) by 0 days.

(21) Appl. No.: 14/652,576

(22) PCT Filed: Sep. 25, 2013

(86) PCT No.: PCT/EP2013/070013
§ 371 (c)(1),
(2) Date: Jun. 16, 2015

(87) PCT Pub. No.: WO2014/049021
PCT Pub. Date: Apr. 3, 2014

(65) Prior Publication Data
US 2016/0010441 A1    Jan. 14, 2016

(30) Foreign Application Priority Data

Sep. 27, 2012 (EP) .................................. 12186285

(51) Int. Cl.
*E21B 43/16* (2006.01)
*C09K 8/86* (2006.01)
(Continued)

(52) U.S. Cl.
CPC .............. *E21B 43/16* (2013.01); *C09K 8/524* (2013.01); *C09K 8/845* (2013.01); *C09K 8/86* (2013.01); *E21B 36/008* (2013.01); *E21B 43/25* (2013.01)

(58) Field of Classification Search
None
See application file for complete search history.

(56) References Cited

U.S. PATENT DOCUMENTS 2,672,201 A    3/1954  Lorenz
2,767,791 A *  10/1956 van Dijck .............. E21B 43/168
                                                166/266
(Continued)

FOREIGN PATENT DOCUMENTS

GB    1362352 A *  8/1974 ............. C06B 47/14
GB    1384890 A    2/1975
(Continued)

OTHER PUBLICATIONS

International Search Report issued Dec. 6, 2013 in PCT/EP2013/070013.

(Continued)

*Primary Examiner* — Angela M DiTrani
*Assistant Examiner* — Anuradha Ahuja
(74) *Attorney, Agent, or Firm* — Drinker Biddle & Reath LLP

(57) ABSTRACT

A process for producing natural gas or natural gas condensate from an underground gas condensate deposit comprising a gas mixture having retrograde condensation characteristics, comprises at least the process steps of: sinking at least one production well into the underground gas condensate deposit and producing natural gas or natural gas condensate from the underground production well through the at least one production well; injecting a free-flowing composition comprising water, urea and at least one metal selected from the group consisting of magnesium and aluminum through the at least one production well into the underground gas condensate deposit; waiting for a rest phase in which the urea present in the free-flowing composition is hydrolyzed and the at least one metal is oxidized; and (Continued)

Figure 1:
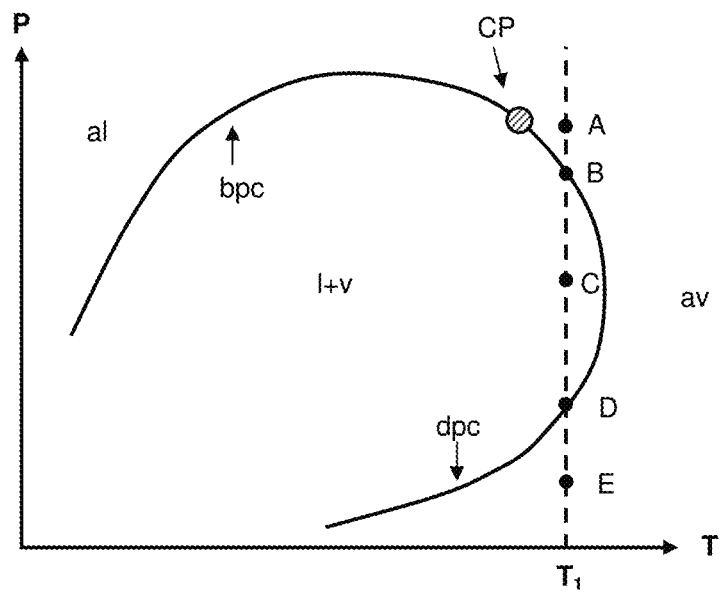

producing natural gas or natural gas condensate from the underground gas condensate deposit through the at least one production well.

16 Claims, 2 Drawing Sheets

(51) Int. Cl.
*C09K 8/524* (2006.01)
*C09K 8/84* (2006.01)
*E21B 36/00* (2006.01)
*E21B 43/25* (2006.01)

(56) References Cited

U.S. PATENT DOCUMENTS

| | | | |
|---|---|---|---|
| 2,799,342 A | 7/1957 | Fatt | |
| 2,987,389 A * | 6/1961 | Proell | C06B 23/007 149/43 |
| 3,510,370 A * | 5/1970 | Jardine | C06B 47/14 149/100 |
| 4,085,799 A | 4/1978 | Bousaid et al. | |
| 4,765,407 A * | 8/1988 | Yuvancic | E21B 43/164 166/266 |
| 5,004,050 A | 4/1991 | Sizonenko et al. | |
| 6,488,086 B1 * | 12/2002 | Daragan | E21B 43/243 166/260 |
| 7,946,342 B1 | 5/2011 | Robertson | |
| 8,826,976 B2 | 9/2014 | Stehle et al. | |
| 2007/0240880 A1 * | 10/2007 | Olsen | E21B 43/006 166/259 |
| 2011/0088899 A1 * | 4/2011 | Stehle | C09K 8/58 166/270 |
| 2012/0080182 A1 | 4/2012 | Mullins | |
| 2012/0138302 A1 | 6/2012 | Stehle | |
| 2012/0255729 A1 | 10/2012 | Stehle et al. | |
| 2012/0305255 A1 * | 12/2012 | Zavolzhskiy | E21B 43/26 166/308.1 |
| 2012/0325481 A1 | 12/2012 | Stehle | |
| 2013/0043024 A1 | 2/2013 | Stehle | |
| 2013/0062078 A1 | 3/2013 | Stehle et al. | |
| 2013/0081809 A1 | 4/2013 | Stehle et al. | |
| 2014/0008065 A1 | 1/2014 | Stehle et al. | |
| 2014/0014327 A1 * | 1/2014 | Badri | E21B 43/32 166/248 |

FOREIGN PATENT DOCUMENTS

| | | |
|---|---|---|
| RU | 2018639 C1 | 8/1994 |
| RU | 2245997 C2 | 2/2005 |
| RU | 2415257 C1 | 3/2011 |
| SU | 1596081 A1 | 9/1990 |

OTHER PUBLICATIONS

Machine Translation of Description of RU2018639.
Machine Translation of Description of RU2064572.
Machine Translation of Description of SU1550099.
Machine Translation of Description of SU1596081.
Machine Translation of Description of SU562639.
Machine Translation of Description of SU605429.
Translation of PCT International Preliminary Report on Patentability in PCT/EP2013/070013 dated Jul. 2, 2014, 6 pages.

* cited by examiner

PROCESS FOR PRODUCING NATURAL GAS AND NATURAL GAS CONDENSATE FROM UNDERGROUND GAS CONDENSATE DEPOSITS

CROSS REFERENCE TO RELATED APPLICATIONS

This application is a National Phase filing under 35 U.S.C. §371 of PCT/EP2013/070013 filed on Sep. 25, 2013; and this application claims priority to application Ser. No. 12/186,285.8 filed in Europe on Sep. 27, 2012. The entire contents of each application are hereby incorporated by reference.

DESCRIPTION

The present invention relates to a process for producing natural gas and/or natural gas condensate from underground gas condensate deposits comprising a gas mixture having retrograde condensation characteristics, and to free-flowing compositions (FC) comprising water, urea and at least one metal selected from the group consisting of magnesium, aluminum and calcium.

Gas mixtures having retrograde condensation characteristics, coming from the gas phase range, undergo partial condensation as the pressure is lowered isothermally and move back over to the gas phase as the pressure is lowered further. In general, retrograde condensation characteristics occur in a gas mixture whose temperature is above the critical temperature of the gas mixture. Natural gas mixtures comprising, for example, as well as methane, ethane, propanes and butanes, 2 to 20% by volume of heavy hydrocarbons ($C_5$+; for example pentanes and hexanes) generally have retrograde condensation characteristics. The phase characteristics of gas mixtures having retrograde condensation characteristics are shown by way of example in FIG. 1.

In the development of gas condensate deposits comprising gas mixtures having retrograde condensation characteristics (also referred to as retrograde gas condensate deposits), the condensation characteristics of the above-described retrograde gas mixtures lead to problems. As natural gas and/or natural gas condensate is withdrawn from such deposits through a production well, the pressure in the deposit is reduced, while the temperature of the deposit remains very substantially unchanged. This quasi-isothermal lowering of the pressure in the deposit results in partial condensation of the natural gas present in the deposit. The lowering of the pressure is at its most marked in the vicinity of the production well (near-well zone). As a result of the partial condensation, especially in the region of the near-well zone, a liquid gas condensate is formed. This liquid gas condensate can block the near-well zone, greatly reducing the production rate of natural gas and/or natural gas condensate through the production well or even stopping it completely. This effect is particularly marked in the case of production of natural gas and/or natural gas condensate deposits having low permeability.

The blockage of the porous rocks in the region of the near-well zone greatly restricts the flow of natural gas and/or natural gas condensate to the production well or even stops it completely. Depending on the geological properties of the deposit and the pressure and temperature conditions in the deposit, the region in which the liquid gas condensate blocks the flow of natural gas and/or natural gas condensate to the production well may be 5 to 100 m in width. The region in which the blockage by the liquid gas condensate is brought about generally has a quasi-cylindrical shape with the production well in the center. The lowering of the deposit pressure which occurs as a result of the production and through the associated blockage with liquid gas condensate can in some cases even lead to the loss of the deposit.

The prior art describes processes which lead to a reduction in the formation of liquid gas condensate and to an improvement in the production of natural gas and/or natural gas condensate from a gas condensate deposit.

RU 2018639 describes a process for preventive avoidance of the formation of liquid gas condensate in a gas condensate deposit. The process described therein is also known as a "cycling process". This involves, in the course of gas production, separating the heavy hydrocarbons ($C_5$+) above ground from light hydrocarbons (for example methane, ethane and propanes). The light hydrocarbons are injected back into the deposit as "dry gas", in order to increase the deposit pressure. The "cycling" process is very inconvenient and costly. In addition, this process cannot reliably avoid the formation of liquid gas condensate in gas condensate deposits.

SU 605429 describes a process for development of gas condensate deposits. In this process, the deposit is flooded with highly mineralized water. The high mineralization prevents the dissolution of gases in the flooding water and thus allows the displacement of the natural gas and of the natural gas condensate from the region of the near-well zone of the production well. A disadvantage of this process is the massive watering-out of the deposit as a result of the flooding water injected. In addition, the flooding water injected can itself lead to blockage of the near-well zone. This process does not enable effective enhancement of the production rates.

SU 1596081 and RU 2064572 disclose processes in which the gas condensate deposit is treated with seismic waves. The seismic waves are supposed to lead to an increase in the production rate from the gas condensate deposit. Especially in the case of low-lying deposits, this process is not very efficient.

RU 2415257 describes a process for stimulating the production rates of gas condensate deposits by means of electromagnetic waves. This process too is unsuitable, especially for low-lying deposits.

RU 2245997 discloses a process in which solvents are injected at cyclic intervals into the near-well zone, in order to dissolve the liquid condensate. The solvents used for this purpose are aqueous mixtures of acetone and methanol, chloroform and methanol or acetone and chloroform. A disadvantage of this process is that the aqueous mixtures introduced likewise lead to watering-out of the near-well zone. In addition, the process is associated with enormous costs due to the organic solvents used. The organic solvents used additionally lead to environmental problems resulting from their toxicity.

It was thus an object of the present invention to provide an improved process for production of natural gas and/or natural gas condensate from underground gas condensate deposits comprising a gas mixture having retrograde condensation characteristics. The process shall have the disadvantages of the prior art described above only to a reduced degree, if at all. The process according to the invention shall be inexpensive and simple to perform, and lead to an effective increase in the production rate of natural gas and/or natural gas condensate from gas condensate deposits after the near-well zone has been blocked by liquid gas condensate. It is a further object of the present invention to provide a free-flowing composition (FC) suitable for use in this process.

The object is also achieved by a process for producing natural gas and/or natural gas condensate from an underground gas condensate deposit comprising a gas mixture having retrograde condensation characteristics, comprising at least the process steps of
  a) sinking at least one production well into the underground gas condensate deposit and producing natural gas and/or natural gas condensate from the underground gas condensate deposit through the at least one production well,
  b) injecting a free-flowing composition (FC) comprising water, urea and at least one metal selected from the group consisting of magnesium, aluminum and calcium through the at least one production well into the underground gas condensate deposit,
  c) waiting for a rest phase in which the urea present in the free-flowing composition (FC) is hydrolyzed and the at least one metal is oxidized,
  d) producing natural gas and/or natural gas condensate from the underground gas condensate deposit through the at least one production well.

The object is achieved by a process for producing natural gas and/or natural gas condensate from an underground gas condensate deposit comprising a gas mixture having retrograde condensation characteristics, comprising at least the process steps of
  a) sinking at least one production well into the underground gas condensate deposit and producing natural gas and/or natural gas condensate from the underground production well through the at least one production well,
  b) injecting a free-flowing composition (FC) comprising water, urea and at least one metal selected from the group consisting of magnesium, aluminum and calcium through the at least one production well into the underground gas condensate deposit,
  c) waiting for a rest phase in which the urea present in the free-flowing composition (FC) is hydrolyzed and the at least one metal is oxidized,
  d) producing natural gas and/or natural gas condensate from the underground gas condensate deposit through the at least one production well.

The process according to the invention enables the effective enhancement of the production rate of natural gas and/or natural gas condensate from a gas condensate deposit in which the near-well zone has been at least partly blocked by liquid natural gas condensate. The process according to the invention has the advantage that it works with inexpensive and toxicologically safe substances. The process according to the invention prevents watering-out of the near-well zone of the gas condensate deposit.

Process Step a)

In process step a), at least one production well is sunk into the underground gas condensate deposit. The sinking of the at least one production well into the underground gas condensate deposit is effected by conventional methods known to those skilled in the art and is described, for example in EP 0 952 300. The production well may be a vertical, horizontal or directional well. The production well is preferably a directional well comprising a quasi-vertical and a quasi-horizontal section.

The gas condensate deposit comprises a gas mixture having retrograde condensation characteristics. Such gas condensate deposits are also referred to as retrograde gas condensate deposits. The gas mixture present in the underground gas condensate deposit comprises generally 80 to 98% by volume of light hydrocarbons and 2 to 20% by volume of heavy hydrocarbons. Light hydrocarbons are understood in accordance with the invention to mean methane, ethane, propanes and butanes. Heavy hydrocarbons are understood in accordance with the invention to mean hydrocarbons having 5 or more carbon atoms, for example pentanes, hexanes and heptanes, and possibly higher hydrocarbons. The terms "propanes", "butanes", "pentanes", "hexanes" and "heptanes" are understood in the present context to mean both the unbranched hydrocarbon compounds and all branched isomers of the above hydrocarbon compounds.

The properties of gas mixtures having retrograde condensation characteristics are shown purely by way of example in FIG. 1. The region labeled (al) describes the monophasic region in which the gas mixture is exclusively in liquid form. The monophasic region (av) shows the region in which the gas mixture is exclusively in gaseous form. The region labeled (l+v) shows the biphasic region in which one portion of the gas mixture is in liquid form and another portion is in gaseous form. (CP) shows the critical point of the gas mixture which connects the bubble point curve (bpc) to the dew point curve (dpc).

The bubble point curve (bpc) separates the monophasic liquid region (al) from the biphasic region (l+v). On the bubble point curve (bpc), the gas mixture is virtually 100% liquid and comprises only infinitesimal amounts of gas.

The dew point curve (dpc) separates the monophasic gaseous region (av) from the biphasic region (c+v). On the dew point curve (dpc), the gas mixture is virtually 100% gaseous and comprises only infinitesimal amounts of liquid.

On the horizontal axis is plotted the temperature (T), and on the vertical axis the pressure (P).

A gas mixture having retrograde condensation characteristics undergoes partial condensation as the pressure is lowered isothermally and moves back over to the gas phase as the pressure is lowered further. The retrograde condensation characteristics generally occur at temperatures above the critical point (CP) of the gas mixture. There follows, by way of example, a description of the behavior of a mixture at a given temperature above the critical point (CP).

At a given temperature ($T_1$), the gas mixture having retrograde condensation characteristics is in gaseous and monophasic form at point (A). As the pressure is lowered isothermally (indicated in FIG. 1 by the broken line), the gas mixture reaches the dew point curve (dpc) at point (B). At this point, the gas mixture is virtually 100% in gaseous form, but an infinitesimal amount of liquid begins to form. As the pressure is lowered further, the gas mixture moves back over into the biphasic region (l+v) in which a liquid phase also forms alongside the gas phase as a result of partial condensation.

At point (C), natural gas and liquid natural gas condensate are thus present alongside one another in a biphasic system. If the pressure is lowered further isothermally, the gas mixture reaches the dew point curve (dpc) again (indicated in FIG. 1 by point (D)). Passing over the dew point curve (dpc), the gas mixture moves back into the monophasic gaseous state. At point (E) in FIG. 1, the gas mixture is again in gaseous and monophasic form. The diagram in FIG. 1 serves merely to illustrate the condensation behavior of retrograde gas mixtures without restricting the present invention.

The deposit temperature $T_D$ of the gas condensate deposits from which the process according to the invention produces natural gas and/or natural gas condensate is typically in the range from greater than 65 to 200° C., preferably in the range from 70 to 150° C., more preferably in the range from 80 to 140° C. and especially in the range from 85° C. to 120° C.

The deposit temperature $T_D$ of the gas condensate deposits must meet the following conditions:
1) $T_D$ is higher than the crystallization temperature $T_C$ of the solution
2) $T_D$ must, within a relatively short period, for example within 1 to 20 days, allow the full hydrolysis of the urea and the full oxidation of the at least one metal.

The present invention thus also provides a process in which the underground gas condensate deposit has a deposit temperature ($T_D$) in the range from greater than 65 to 200° C., preferably in the range from 70 to 150° C., more preferably in the range from 80 to 140° C. and especially in the range from 85 to 120° C.

The initial deposit pressure, i.e. the pressure prior to performance of the process according to the invention, is typically in the range from 80 to 1500 bar; the initial deposit pressure in the case of gas condensate deposits is normally 300 to 600 bar.

The permeability of the underground gas condensate deposits is generally in the range from 0.01 to 10 mD (millidarcies).

The porosity of the underground gas condensate deposits is generally in the range from 0.1 to 30%.

After the production well has been sunk into the underground deposit, the deposit pressure is generally at first sufficient to produce natural gas and/or natural gas condensate through the production well by conventional methods. The terms "natural gas" and "natural gas condensate" in this context do not of course mean a pure hydrocarbon mixture. The natural gas and/or natural gas condensate may of course, as well as methane, ethane, propanes, butanes, hexanes and heptanes, and possibly higher hydrocarbons, also comprise other substances.

Further substances may, for example, be sulfur-containing hydrocarbons or formation water. Formation water in the present context is understood to mean water originally present in the deposit, and water which has been introduced into the deposit by process steps of secondary and tertiary production, for example what is called flooding water. The formation water also comprises water which may have been introduced into the gas condensate deposit by the process according to the invention.

A gas mixture having retrograde condensation characteristics has, for example, the following composition (figures in mol %):

| | |
|---|---|
| methane | 74.6% |
| ethane | 8.9% |
| propane | 3.8% |
| butane | 1.8% |
| pentane | 6.4% |
| nitrogen | 4.5% |
| original density | 0.745 g/cm$^3$ |

"Natural gas" is understood in the present context to mean gaseous gas mixtures which are produced from the gas condensate deposit. "Natural gas condensate" is understood to mean liquid mixtures which are produced from the gas condensate deposit. The state of matter of the mixtures produced from the gas condensate deposit depends on the temperature and the pressure in the deposit or in the production well.

By the process according to the invention, it is possible to produce exclusively natural gas through the production well. In addition, it is possible to produce exclusively natural gas condensate through the production well. It is also possible to produce a mixture of natural gas and natural gas condensate through the production well. The state of matter of any further substances present in the natural gas or in the natural gas condensate likewise depends on the pressure and temperature in the deposit or in the production well. The further substances may likewise be present in liquid form or in gaseous form in the mixture produced through the production well.

If, after the production well has been sunk (process step a)), the deposit pressure is sufficient to produce natural gas and/or natural gas condensate from the deposit through the production well, this is done by conventional production methods. The present invention thus also provides a process in which, after the at least one production well has been sunk into the underground gas condensate deposit (process step a)) and before the free-flowing composition (FC) has been injected into the underground gas condensate deposit (process step b)), natural gas and/or natural gas condensate is first produced (by conventional methods) through the at least one production well.

However, this is not absolutely necessary. It is also possible to perform process step b) as a preventive measure directly after the sinking of the production well, in order to avoid the formation of natural gas condensate.

In general, during process step a), however, natural gas and/or natural gas condensate is first produced by conventional methods from the gas condensate deposit. As a result of the production of natural gas and/or natural gas condensate from the gas condensate deposit, the pressure in the gas condensate deposit decreases, while the temperature of the gas condensate deposit remains very substantially unchanged. Thus, the production of natural gas and/or natural gas condensate from the gas condensate deposit leads to an isothermal lowering of the pressure. "Isothermal" is understood in the present context to mean that the temperature of the gas condensate deposit in the course of performance of the process according to the invention remains very substantially constant, which means that the temperature of the gas condensate deposit changes by not more than +/−20° C., preferably by +/−10° C. and more preferably by +/−5° C. in the course of performance of the process according to the invention compared to the initial deposit temperature prior to performance of the process according to the invention.

Figure 2:
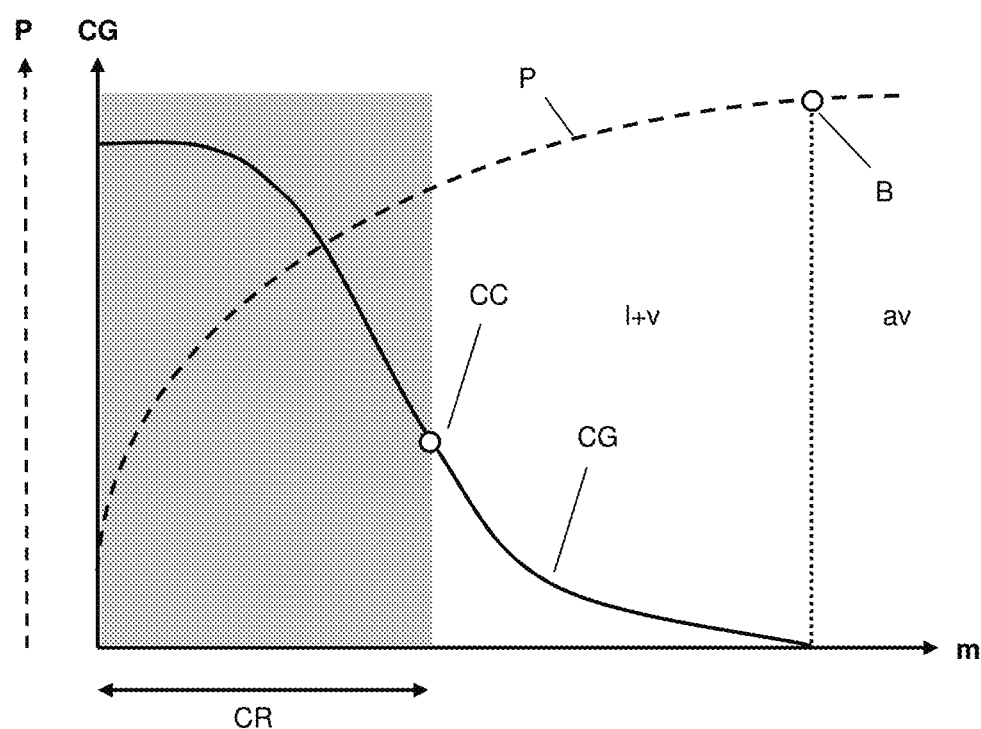

The lowering of the pressure is at its most marked in the vicinity of the production well and decreases with increasing distance from the production well. FIG. 2 shows, by way of example, the pressure profile in the underground gas condensate deposit as a function of distance from the production well. The distance from the production well is plotted on the horizontal axis in meters. The deposit pressure (P) is plotted on the dotted vertical axis. At a particular distance from the production well, the deposit pressure (P) reaches a value at which the partial condensation of the retrograde gas mixture commences. This distance is shown by the vertical dotted line in FIG. 2. At point (B) on the dotted deposit pressure curve (P), the formation of a biphasic mixture comprising natural gas and natural gas condensate commences. Point (B) on the dotted deposit pressure curve (P) corresponds to point (B) in FIG. 1. To the left of the dotted line, the gas mixture is in biphasic form ((l+v) region). To the right of the dotted line, the gas mixture is in monophasic form ((av) region).

With onset of the partial condensation, there is a rise in the proportion of liquid natural gas condensate. The proportion of liquid natural gas condensate is plotted on the vertical axis (CG) and is shown by the solid curve (CG) in FIG. 2. From a certain concentration of liquid natural gas condensate, the near-well zone is blocked, as a result of which the production rates of natural gas and/or natural gas condensate from the gas condensate deposit decrease or stop completely. This critical region is shown by the region (CR) shaded gray in FIG. 2. The critical concentration of the liquid natural gas condensate in the gas mixture is shown by the point (CC) on the curve (CG) in FIG. 2. FIG. 2 illustrates, merely by way of example, the conditions in a gas condensate deposit comprising a gas mixture having retrograde condensation characteristics, without restricting the present invention thereto.

The production of natural gas and/or natural gas condensate from the underground gas condensate deposit through the at least one production well is generally continued until a reduction in the production rate of natural gas and/or natural gas condensate is registered.

The reduction in the production rate is attributable to the formation of the critical region (CR) at least partly blocked by liquid natural gas condensate.

The present invention thus also provides a process in which the underground gas condensate deposit prior to performance of process step b) has a critical region (CR) at least partly blocked by liquid natural gas condensate.

Prior to the injection of the free-flowing composition (FC) in process step b), the production of natural gas and/or natural gas condensate is generally stopped.

The present invention thus also provides a process in which process step a) comprises the sinking of at least one production well into the underground gas condensate deposit, the production of natural gas and/or natural gas condensate from the underground gas condensate deposit until formation of a critical region (CR) at least partly blocked by liquid natural gas condensate and the stopping of the production of natural gas and/or natural gas condensate from the underground gas condensate deposit through the at least one production well.

Process Step b)

In process step b), a free-flowing composition (FC) comprising water, urea and at least one metal selected from the group consisting of magnesium, aluminum and calcium is injected through the production well into the underground gas condensate deposit, "Metal" is also understood in the present context to mean metal alloys comprising at least one metal selected from the group consisting of magnesium, aluminum and calcium. Preference is given to using metals, i.e. in unalloyed form.

"At least one metal" is understood in the present context to mean exactly one metal, and also mixtures of two or more metals selected from the group consisting of magnesium, aluminum and calcium.

A preferred metal is magnesium, aluminum or a mixture of magnesium and aluminum. A particularly preferred metal is aluminum.

The present invention thus also provides a process in which the free-flowing composition (FC) comprises water, urea and magnesium, aluminum or mixtures of magnesium or aluminum. The present invention further provides a process in which the free-flowing composition (FC) comprises water, urea and aluminum.

The metals are preferably used in particulate form. The particle size of the metals is generally 20 nm to 1000 μm, preferably 20 nm to 500 μm and more preferably 50 nm to 50 μm, preference being given to aluminum. The particle size of the metals may thus be in the μ-meter range (μ metal) or in the n-meter range (n metal). The industrial manufacture of the metal particles is known and can be effected, for example, by means of vibratory mills or roll mills.

The present invention thus also provides a process in which the free-flowing composition (FC) comprises at least one metal in particulate form, the particle size of the at least one metal being in the range from 20 nm to 1000 μm, preferably in the range from 20 nm to 500 μm and more preferably in the range from 50 nm to 50 μm.

The metal particles used generally comprise a passivation layer comprising oxides and/or hydroxides of the corresponding metal, i.e. aluminum oxide and/or aluminum hydroxide in the case of aluminum, which is used with preference.

This passivation layer slows the oxidation reaction of the metal with water. The passivation layer is gradually dissolved in water at the temperatures of the gas condensate deposit. After the dissolution of the passivation layer, the actual oxidation reaction of the metal with water sets in.

In the case of μ-aluminum, the passivation layer in the case of aluminum particles having a particle size in the range from 80 to 120 μm, for example, is 14 to 20 μm in thickness. In the case of n-aluminum, the passivation layer in the case of aluminum particles having a particle size in the range from 80 to 120 nm, for example, is 2 to 7 nm in thickness.

The oxidation of aluminum with water follows the reaction equation below

$$2Al+3H_2O \Rightarrow Al_2O_3+3H_2+\text{heat}$$

2 mol of aluminum and 3 mol of water thus give rise to 1 mol of aluminum oxide, 3 mol of hydrogen and heat.

The exothermic oxidation of aluminum with water releases 459.1 kJ of heat per mole of aluminum.

The evolution of heat takes place at the surface of the aluminum particles, i.e. at the interface between aluminum and water. As a result, primarily the aluminum particles and then the water in the free-flowing composition (FC) are heated.

At temperatures of the free-flowing composition (FC) below 65° C., the oxidation of aluminum with water proceeds only very slowly without any noticeable rise in the temperature of the free-flowing composition (FC). At temperatures of the free-flowing composition (FC) above 65° C., in contrast, the oxidation of aluminum with water proceeds rapidly. At these temperatures, the oxidation of aluminum with water takes place spontaneously and continues without external energy supply. In the course of the exothermic reaction, temperatures of the free-flowing composition (FC) at which the water vaporizes are attained. In the course of the oxidation of aluminum with water, water is consumed.

In a preferred embodiment, the free-flowing composition (FC) comprises water and aluminum in the following compositions (in % by weight): $H_2O:Al=8$ to 25% by weight:1% by weight.

At a ratio of $H_2O:Al$ of 6:1, the full vaporization of the water in the oxidation reaction between water and aluminum is registered, the oxidation reaction being performed at atmospheric pressure.

The oxidation reaction of aluminum with water forms, as oxidation products, aluminum hydroxides and aluminum oxides, which are insoluble in water. Owing to the low particle size of the aluminum used in the oxidation reaction, the oxidation products (aluminum hydroxide and aluminum oxide) have a high degree of dispersion. The aluminum hydroxide and/or aluminum oxide formed in the oxidation reaction is additionally porous. The oxidation products thus do not block the pores present in the underground gas condensate deposit.

The heat which arises in the course of the oxidation of aluminum with water, in conjunction with the hydrogen formed, can result in widening of the pores of the underground gas condensate deposit and in an increase in the porosity of the underground gas condensate deposit. This is accomplished by the gas pressure which arises (effect of steam or gas pressure) in conjunction with the heat which arises (thermal shock). As a result of this, the pores present in the underground gas condensate deposit can be widened. New pores may also be formed in the underground gas condensate deposit. As explained above, this is promoted by the evolution of hydrogen. The oxidation of one gram of aluminum with water evolves approx. 1.2 liters of hydrogen.

The free-flowing composition (FC) comprises, in addition to the at least one metal, urea and water.

In general, the free-flowing composition (FC) comprises 5 to 70% by weight of urea, 1 to 30% by weight of at least one metal, preferably aluminum, and 20 to 80% by weight of water, based in each case on the total weight of the free-flowing composition (FC). The present invention thus also provides a process in which the free-flowing composition (FC) comprises 5 to 70% by weight of urea, 1 to 30% by weight of at least one metal selected from the group consisting of magnesium, aluminum and calcium, and 20 to 80% by weight of water, based in each case on the total weight of the free-flowing composition (FC).

The free-flowing composition (FC) preferably comprises 20 to 40% by weight of urea, 2 to 10% by weight of at least one metal, preferably aluminum, and 30 to 80% by weight of water, based in each case on the total weight of the free-flowing composition (FC).

The present invention thus also provides a process wherein the free-flowing composition (FC) comprises 20 to 40% by weight of urea, 2 to 10% by weight of at least one metal selected from the group consisting of magnesium, aluminum and calcium, and 30 to 80% by weight of water, based in each case on the total weight of the free-flowing composition (FC).

Urea is converted in the presence of water by hydrolysis to ammonia and carbon dioxide according to the following equation:

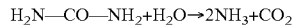

One mole of urea and one mole of water form two moles of ammonia and one mole of carbon dioxide. The hydrolysis of urea with water under the action of heat is also referred to as thermohydrolysis. From a temperature greater than 65° C., the hydrolysis of urea and water proceeds with sufficient rapidity to fully hydrolyze the urea and the water to carbon dioxide and ammonia within economically viable periods of time. The rate of hydrolysis of the urea present in the free-flowing composition (FC) rises with increasing temperature.

The free-flowing composition (FC) is typically provided above ground by dissolving the urea in water. It is optionally also possible to add further additives, for example surface-active components (surfactants). The urea is typically used in the form of granules, or industrially produced aqueous urea solution is used, for example "Ad Blue®" 32.5% aqueous urea solution from BASF SE.

In order to accelerate the dissolution of the urea in water, the free-flowing composition (FC) can be heated. Subsequently or simultaneously, the at least one metal is suspended. It is additionally possible to add thickeners to the free-flowing composition (FC) in order to increase the viscosity of the free-flowing composition (FC) and to prevent the sedimentation of the metal particles used.

Examples of suitable thickeners include synthetic polymers, for example polyacrylamide or copolymers of acrylamide and other monomers, especially monomers having sulfo groups, and polymers of natural origin, for example glucosyl glucanes, xanthan, diutans or glucan. Preference is given to glucan.

Owing to the low particle size of the metal used and the turbulences in the production well, the metals sediment only gradually, and so the addition of thickeners is not absolutely necessary. The turbulences which occur in the course of injection of the free-flowing composition (FC) in process step b) may also be sufficient, even without the use of thickeners, to keep the metal particles suspended in the free-flowing composition (FC) during the rest phase in process step c).

The free-flowing composition (FC) may consist merely of water, urea and at least one metal, with corresponding application of the above details and preferences. However, it is also possible to add at least one surface-active component (surfactant) to the free-flowing composition (FC). In this case, the free-flowing composition (FC) comprises preferably 0.1 to 5% by weight, more preferably 0.5 to 1% by weight, of at least one surfactant, based on the total weight of the free-flowing composition (FC).

The surface-active components used may be anionic, cationic and nonionic surfactants.

Commonly used nonionic surfactants are, for example, ethoxylated mono-, di- and trialkylphenols, ethoxylated fatty alcohols and polyalkylene oxides. In addition to the unmixed polyalkylene oxides, preferably $C_2$-$C_4$-alkylene oxides and phenyl-substituted $C_2$-$C_4$-alkylene oxides, especially polyethylene oxides, polypropylene oxides and poly(phenylethylene oxides), particularly block copolymers, especially polymers having polypropylene oxide and polyethylene oxide blocks or poly(phenylethylene oxide) and polyethylene oxide blocks, and also random copolymers of these alkylene oxides, are suitable. Such alkylene oxide block copolymers are known and are commercially available, for example, under the Tetronic and Pluronic names (BASF).

Typical anionic surfactants are, for example, alkali metal and ammonium salts of alkyl sulfates (alkyl radical: $C_8$-$C_{12}$), of sulfuric monoesters of ethoxylated alkanols (alkyl radical: $C_{12}$-$C_{18}$) and ethoxylated alkylphenols (alkyl radicals: $C_4$-$C_{12}$), and of alkylsulfonic acids (alkyl radical: $C_{12}$-$C_{18}$).

Suitable cationic surfactants are, for example, the following salts having $C_6$-$C_{18}$-alkyl, alkylaryl or heterocyclic radicals: primary, secondary, tertiary or quaternary ammonium salts, pyridinium salts, imidazolinium salts, oxazolinium salts, morpholinium salts, propylium salts, sulfonium salts and phosphonium salts. Examples include dodecylammonium acetate or the corresponding sulfate, disulfates or acetates of the various 2-(N,N,N-trimethylammonium)ethylparaffin esters, N-cetylpyridinium sulfate and N-laurylpyridinium salts, cetyltrimethylammonium bromide and sodium laurylsulfate.

The use of surface-active components in the free-flowing composition (FC) lowers the surface tension of the free-flowing composition (FC). This allows the free-flowing composition (FC) to better penetrate the regions of the near-well zone blocked by the natural gas condensate, and to displace the natural gas condensate. In one embodiment, the free-flowing composition (FC) does not comprise any surfactants.

The present invention thus also provides a process in which the free-flowing composition (FC) is heated prior to or during the injection in process step b). However, this is not absolutely necessary, since the inventive urea concentrations, as evident from FIG. 3, dissolve fully in the water present in the free-flowing composition (FC) at temperatures in the range from minus 5 to 40° C.

The present invention thus also provides a process in which the free-flowing composition (FC) in process step b) is injected with a temperature ($T_{FC}$) below the deposit temperature ($T_D$) of the gas condensate deposit.

The present invention thus also provides a process in which the free-flowing composition (FC) in process step b) is injected with a temperature ($T_{FC}$) in the range from minus 5 to 40° C.

Figure 3:
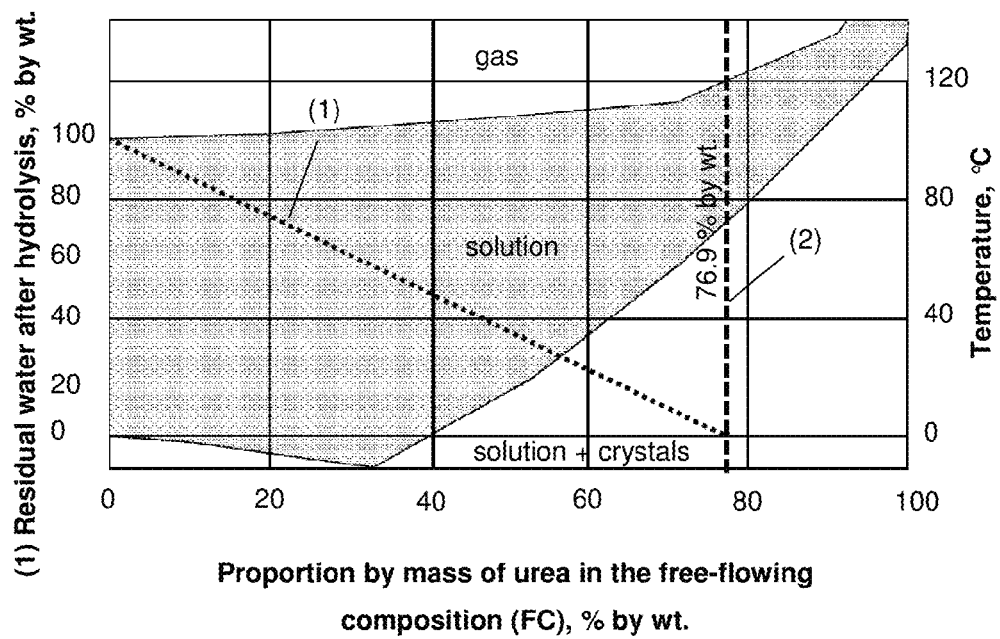

The dissolution behavior of urea in water is shown in the phase diagram in FIG. 3. On the horizontal axis is plotted the urea content of the free-flowing composition (FC) in % by weight, based on the total weight of the free-flowing composition (FC), in the case that the free-flowing composition (FC) comprises only urea and water. On the right-hand vertical axis is plotted the temperature in ° C. The left-hand vertical axis and the dotted curve (1) show the proportion of the residual water (RW) remaining after the hydrolysis of the urea, based on the total weight of the free-flowing composition (FC) used.

The dotted vertical line (2) in FIG. 3 indicates the urea concentration (76.9% by weight) at which the water present in the free-flowing composition (FC) would be consumed completely in the hydrolysis of the urea, meaning that the proportion of residual water (RW) remaining after the hydrolysis of the urea would be 0. If free-flowing compositions (FC) are used with the preferably relatively low urea concentrations in accordance with the invention, residual water (RW) remains after the hydrolysis of the urea. The amount of residual water (RW) remaining as a function of the urea concentration of the free-flowing composition (FC) used is shown in FIG. 3 by the dotted curve (1).

If the free-flowing composition (FC) were to comprise only water and urea, the residual water (RW) remaining after the urea hydrolysis can be calculated by the following formula:

$$RW = 100\% \text{ by weight} - (KH \cdot 1.3)$$

RW therein states the proportion of residual water (RW) remaining after the hydrolysis of the urea in % by weight, based on the total weight of the free-flowing composition (FC) used, in the case that it comprises only water and urea.

KH therein states the urea content of the free-flowing composition (FC) used in % by weight, based on the total weight of the free-flowing composition (FC) used.

If the free-flowing composition (FC) used is a solution comprising 60% by weight of urea (i.e. KH=60% by weight) and 40% by weight of water (based on the total weight of the free-flowing composition (FC)), the proportion of residual water (RW) remaining after the hydrolysis is calculated as $$RW = 100\% \text{ by weight} - (60\% \text{ by weight} \cdot 1.3) = 22\% \text{ by weight}$$

For the free-flowing composition (FC) used in process step b), the urea concentration is preferably selected such that the crystallization temperature ($T_C$) of the free-flowing composition (FC) is below the deposit temperature ($T_D$) of the underground gas condensate deposit, the crystallization temperature ($T_C$) being understood to mean the temperature below which urea present in the free-flowing composition (FC) crystallizes out, such that the free-flowing composition (FC) comprises water, urea in dissolved form and urea in undissolved form.

In other words, the deposit temperature $T_D$ is preferably above the crystallization temperature $T_C$ of the free-flowing composition (FC) used. The crystallization temperature $T_C$ of the free-flowing composition (FC) corresponds, in FIG. 1, to the curve which separates the gray-hatched region "solution" from the region "solution+crystals". If $T_D$ is greater than $T_C$, the crystallization of urea out of the free-flowing composition (FC) in the underground gas condensate deposit can be reliably avoided. The crystallization of urea in the underground gas condensate deposit could lead to blockage of the near-well zone of the underground gas condensate deposit.

The present invention thus also provides a process in which the free-flowing composition (FC) has a crystallization temperature ($T_C$) below the deposit temperature ($T_D$) of the underground gas condensate deposit.

The present invention further provides a process in which the deposit temperature ($T_D$) of the underground gas condensate deposit is higher than the crystallization temperature ($T_C$) of the free-flowing composition (FC).

At the urea concentrations preferably present in the inventive free-flowing composition (FC), which are in the range from 5 to 40% by weight and preferably 20 to 40% by weight of urea, based on the total weight of the free-flowing aqueous composition (FC), proportions of residual water thus remain in the hydrolysis of urea with water. The inventive free-flowing composition (FC) has the advantage that this residual water is partly or fully consumed in the oxidation of the at least one metal, preferably aluminum, present in the free-flowing composition (FC).

It has been found that, surprisingly, the use of urea in conjunction with at least one metal, preferably aluminum, leads to a synergistic effect.

As explained above, the oxidation reaction between aluminum and water proceeds spontaneously at temperatures above 65° C., without any need for further supply of heat thereto. At these temperatures (>65° C.), the hydrolysis of urea also sets in and takes place within economically viable periods of time, for example within 1 to 10 days.

The present invention thus also provides a process in which the duration of the rest phase in process step c) is 1 to 10 days.

These two reactions, i.e. the oxidation reaction of the at least one metal, preferably aluminum, with water and the hydrolysis of urea with water, enhance one another.

The hydrolysis of urea forms, as explained above, carbon dioxide and ammonia. The ammonia dissolves preferentially in the water present in the free-flowing composition (FC), and in any formation water present in the well. This increases the pH of the water present in the free-flowing composition (FC). The rise in the pH accelerates the dissolution of the passivation layer present on the metal particles. The elevated pH additionally accelerates the oxidation reaction of the metal with water. The exothermic reaction of the metal with water releases heat, which itself in turn accelerates the hydrolysis of the urea with water.

Thus, the two reactions which proceed, i.e. the oxidation of the at least one metal with water and the hydrolysis of the urea with water, enhance one another in the free-flowing composition (FC).

A portion of the water present in the free-flowing composition (FC) is thus consumed by the hydrolysis of urea. A further portion of the water present in the free-flowing composition (FC) is consumed by the oxidation of the metal, preferably the aluminum.

During the rest phase in process step c) of the present invention, urea is thus hydrolyzed and the at least one metal is oxidized, with partial or full consumption of the water present in the free-flowing composition (FC) for the hydrolysis reaction and the oxidation reaction.

The consumption of the water present in the free-flowing composition (FC) prevents or at least reduces the contamination of the underground gas condensate deposit with water. This prevents blockage of the pores present in the underground gas condensate deposit by water introduced from the outside.

The present invention thus also provides a process in which the duration of the rest phase is selected such that the urea originally present in the free-flowing composition (FC) is fully hydrolyzed in the underground gas condensate deposit to carbon dioxide and ammonia, and the at least one metal originally present in the free-flowing composition (FC) is fully oxidized, and 60 to 100% by weight of the water originally present in the free-flowing composition (FC) is consumed.

For dissolution of the urea in the water present in the free-flowing composition (FC), as evident from FIG. 3, only low temperatures in the range from minus 5 to 40° C. are needed. These relatively low temperatures have the advantage that the hydrolysis of the urea proceeds very slowly at these temperatures, and so ammonia and carbon dioxide are formed only in very small amounts in the course of production of the free-flowing composition (FC). The oxidation reaction of the at least one metal with water is also very slow in these temperatures.

As explained above, the dissolution of the urea in the water present in the free-flowing composition (FC) can be accelerated by heating. The heating is effected by customary heating elements, for example an electrical heater. The vessels used for production of the free-flowing composition (FC) may, for example, be stirred tanks with a propeller stirrer.

The present invention thus also provides a free-flowing composition (FC) which comprises water, urea and at least one metal selected from the group consisting of magnesium, aluminum and calcium.

The present invention additionally provides a free-flowing aqueous composition (FC) comprising 5 to 40% by weight of urea, 1 to 30% by weight of at least one metal selected from the group consisting of magnesium, aluminum and calcium, preferably aluminum, and 30 to 80% by weight of water, based in each case on the total weight of the free-flowing composition (FC).

The present invention additionally provides a free-flowing composition (FC) comprising 20 to 40% by weight of urea, 2 to 10% by weight of at least one metal selected from the group consisting of magnesium, aluminum and calcium, preferably aluminum, and 30 to 80% by weight of water, based in each case on the total weight of the free-flowing composition (FC).

The percentages by weight of urea, the at least one metal and water preferably add up to 100% by weight.

The free-flowing composition (FC) described can also be used for flooding of gas condensate deposits. In this case, at least one well is used as a continuous injection well. The free-flowing composition (FC) is injected into this well. The free-flowing composition (FC) forms gases in the deposit.

This process can be used particularly efficiently in the development of deposits which have been abandoned owing to massive dropout of a retrograde gas condensate.

"Free-flowing" in connection with the free-flowing composition (FC) means in the present context that the free-flowing composition (FC) can be pumped into the well by means of conventional pumps.

The amount of the free-flowing composition (FC) injected in process step b) depends on the geological parameters of the underground gas condensate deposit, including the permeability of the deposit and the size of the region (critical region (CR) according to FIG. 2) in which the near-well zone is blocked by liquid natural gas condensate. The free-flowing composition (FC) is preferably injected in volumes corresponding to not more than the pore volume of the critical region (CR) blocked by the liquid natural gas condensate. Suitable volumes of the free-flowing composition (FC) injected in process step b) are in the range from 1 to 10 $m^3$ per 1 m of the production well surrounded by the critical region (CR), preferably in the range from 2 to 8 $m^3$, more preferably in the range from 3 to 7 $m^3$.

The present invention thus also provides a process in which the free-flowing composition (FC) is injected in process step b) in volumes which, in the hydrolysis of urea and the oxidation of the at least one metal, lead to a gas volume of carbon dioxide, ammonia and hydrogen corresponding at least to the pore volume of the critical region (CR).

Process Step c)

The injection of the free-flowing composition (FC) is generally followed by a rest phase in which the urea in the underground gas condensate deposit is hydrolyzed to ammonia and carbon dioxide, and the at least one metal is oxidized. In a preferred embodiment, the duration of this rest phase is selected such that complete hydrolysis of the urea and complete oxidation of the at least one metal take place.

The rate with which the hydrolysis of the urea and the oxidation of the at least one metal proceed depends on the deposit temperature $T_D$ of the underground gas condensate deposit and the temperature with which the free-flowing composition (FC) is injected in process step b). At high deposit temperatures $T_D$, the hydrolysis and the oxidation proceed correspondingly more rapidly, and so the rest phase can be selected with a relatively short duration. The duration of the rest phase is generally in the range from 1 to 10 days. At deposit temperatures $T_D$ of $\geq 100°$ C., the rest phase selected may be relatively short, for example 1 to 5 days. At deposit temperatures $T_D$ in the range from 80 to <100° C., the duration selected for the rest phase is a range from 5 to 10 days.

The rest phase allows the urea present in the free-flowing composition (FC) to be fully hydrolyzed in the underground gas condensate deposit, and the metal present in the free-flowing composition (FC) to be fully oxidized.

During the rest phase, in a preferred embodiment, the production well is closed. This can be done by customary means, for example packers. As a result of the closure of the production well, the pressure in the critical region of the underground gas condensate deposit rises, as a result of which the efficiency of the process according to the invention is increased.

The present invention thus also provides a process in which the at least one production well is closed during the rest phase in step c).

The carbon dioxide formed and the hydrogen formed dissolve partly in the natural gas and predominantly in the liquid natural gas condensate. This lowers the viscosity of the liquid natural gas condensate, as a result of which the mobility of the liquid natural gas condensate in the critical region (CR) of the gas condensate deposit is distinctly enhanced. The ammonia formed dissolves in the formation water present in the deposit and in the water injected with the free-flowing composition (FC), and forms an alkaline ammonia buffer system having a pH of 9 to 10. If the deposit is slightly watered out, highly alkaline solutions are formed. Under particular conditions, ammonia can also be partly liquefied in the deposit. Liquid ammonia and aqueous ammonia solutions are very good solvents. This additionally increases the mobility of the gas condensate.

This buffer system has a surfactant-like effect in the underground gas condensate deposit. This reduces the interfacial tension between the phases, i.e. between the natural gas phase and the liquid natural gas condensate phase and possibly the formation water phase. The formation of the gases (ammonia, hydrogen and carbon dioxide) in the underground gas condensate deposit additionally also has a purely mechanical displacing action on the liquid natural gas condensate. The lowering of the viscosity of the liquid natural gas condensate and the increasing of the mobility of the liquid natural gas condensate facilitate the production of natural gas and liquid natural gas condensate from the underground gas condensate deposit. This distinctly enhances the production rate. In the course of production of natural gas, the natural gas also purges the liquid natural gas condensate present in the critical region (CR) of the underground gas condensate deposit in the direction of the production well. This leads to a further enhancement of the production rate.

In a preferred embodiment, in process step b), the free-flowing composition (FC) is introduced in such amounts that the gas volume formed in the hydrolysis of urea corresponds at least to the pore volume of the critical region of the underground gas condensate deposit.

The present invention thus also provides for the use of a free-flowing composition (FC) comprising water and urea as a means of enhancing the production rates of natural gas and/or natural gas condensate from a gas condensate deposit comprising a gas mixture having retrograde condensation characteristics. For the use of the free-flowing composition (FC) as a means for enhancing the production rates, the above details and preferences in relation to the process according to the invention and the free-flowing composition (FC) apply correspondingly.

Process Step d)

In process step d), natural gas and/or natural gas condensate is produced from the underground gas condensate deposit, i.e. production is restarted. The production is effected by conventional methods. The natural gas and the natural gas condensate can be produced through the production well through which the free-flowing composition (FC) was injected in process step b) into the underground gas condensate deposit. It is also possible to sink further wells into the underground gas condensate deposit. The production of natural gas and natural gas condensate can then be effected through the production well or through the further well. The production well can also fulfill the function of an injection well through which a flooding medium is injected into the underground gas condensate deposit, in which case the actual production is effected through the one or more further wells. It is also possible to inject a flooding medium through the one or more further wells into the underground gas condensate deposit and to undertake production through the production well through which the free-flowing composition (FC) was injected in process step b).

The production of natural gas and/or natural gas condensate from the underground gas condensate deposit in process step d) is continued until the lowering of the pressure which has occurred as a result in the underground gas condensate deposit leads again to formation of liquid natural gas condensate, as a result of which the critical region (CR) arises and the production rates decrease significantly. In this case, steps b) and c) are performed again. Steps b) and c) of the process according to the invention are thus performed whenever a critical region (CR) which has been at least partly blocked by liquid natural gas condensate forms again in the underground gas condensate deposit.

The present invention thus also provides for the use of a free-flowing composition (FC) as a means of enhancing the production rates of natural gas and/or natural gas condensate from an underground gas condensate deposit comprising a gas mixture having retrograde condensation characteristics.

The present invention is illustrated in detail by the example which follows and FIGS. 1, 2, 3 and 4, without being restricted thereto. The meanings of the reference symbols in the figures are as follows:

al monophasic liquid region
bpc bubble point curve
l+v biphasic region
dpc dew point curve
CP critical point
av monophasic gaseous region
A, B, C, D and E points in the isothermal lowering of the pressure of the retrograde gas mixture
CG concentration of the liquid natural gas condensate in the gas mixture
CR critical region
CC critical concentration of the liquid natural gas condensate in the gas mixture
P pressure
T temperature
(1) concentration of the residual water after the hydrolysis of the urea in the free-flowing composition (FC) used
(2) concentration of the urea at which the water in the free-flowing composition is fully consumed in the hydrolysis of urea
3 production well
4 critical region (CR) blocked with liquid natural gas condensate
5 fracture in the underground gas condensate deposit The individual figures show:

FIG. 1

The phase behavior of gas mixtures having retrograde condensation characteristics.

FIG. 2

The pressure profile and the concentration of liquid natural gas condensate in an underground gas condensate deposit as a function of the distance from the production well.

FIG. 3

The phase diagram of an aqueous urea solution.

FIGS. 4a, 4b, 4c

Various embodiments of the production well 3.

FIGS. 1, 2 and 3 have already been described in the description of the present invention.

Figure 4:
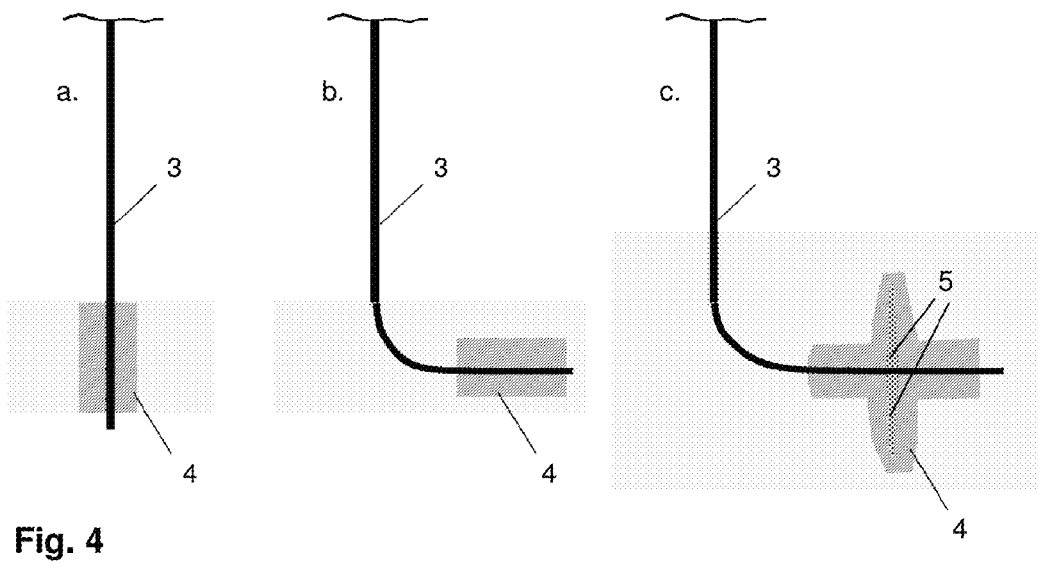

FIG. 4 shows different embodiments of a sunk well 3. FIG. 4a shows a vertical production well. The region 4 is the region blocked by liquid natural gas condensate.

FIG. 4b shows an embodiment in which a directional well has been sunk. FIG. 4c shows an embodiment in which a directional well has been sunk and in which the underground gas condensate deposit has a fracture 5.

EXAMPLE

For development of a gas condensate deposit at a depth in the range from 3400 to 3700 m, a directional production well 3 according to FIG. 4b or FIG. 4c is sunk. The thickness of the productive stratum is 50 to 80 m. The deposit temperature $T_D$ is 105° C. The deposit pressure is approx. 650 atm (658.6 bar). The permeability of the deposit is low and is between 0.2 and 1.0 µm². After the directional production well 3 has been sunk, it is fracked in the region of the productive stratum, forming a fissured zone 5. The porosity of the gas condensate deposit is in the range from 0.2 to 0.25%. The sinking and fracking of the production well 3 is followed by commencement of the production of natural gas and/or natural gas condensate by conventional methods. After a year of production of natural gas and/or natural gas condensate, a significant reduction in the production rate is registered. The reduction in the production rate is attributable to blockage of the near-well zone by liquid natural gas condensate. The critical region 4 in which the blockage by liquid natural gas condensate has occurred is estimated to have a radius of approx. 10 m. The region has a cylindrical shape with the production well 3 in the center. In order to dissolve the blockage, a free-flowing composition (FC) is produced, comprising 30 tonnes of water, 1.5 tonnes of aluminum powder and 10 tonnes of urea. The aluminum powder is suspended by a mechanical or hydraulic mixer. The urea dissolves completely in the free-flowing composition (FC). Subsequently, the free-flowing composition (FC) is injected through the production well 3 into the critical region 4 of the gas condensate deposit. The injection of the free-flowing composition (FC) takes 1 to 2 hours. The free-flowing composition (FC) is injected by means of conventional pumps. After the free-flowing composition (FC) has been injected into the gas condensate deposit, the urea is hydrolyzed in the gas condensate deposit, forming approx. 13 000 m³ of gases (ammonia and carbon dioxide). The oxidation of the aluminum forms approx. 1800 m³ of hydrogen. The hydrolysis of the urea consumes approx. 40% of the water originally present in the free-flowing composition (FC). The rest of the water is consumed or vaporized in the course of oxidation of the aluminum. The injection of the free-flowing composition (FC) into the gas condensate deposit is followed by a rest phase. The rest phase is 3 to 5 days. During the rest phase, the urea is fully hydrolyzed in the underground gas condensate deposit, and the aluminum is fully oxidized. During the rest phase, the production well is closed. This raises the pressure in the critical region (CR) of the underground gas condensate deposit, increasing the efficiency of the process according to the invention. The hydrolysis of the urea and the oxidation of the aluminum result in almost complete consumption of the water injected into the underground gas condensate deposit with the free-flowing composition (FC). Blockage of the near-well zone by water is prevented as a result.

After the rest phase, production is restarted by means of conventional methods. The hydrolysis of the urea and the oxidation of the aluminum in the underground gas condensate deposit distinctly enhance the mobility of the gas mixture present in the deposit. The natural gas subsequently produced likewise purges any liquid natural gas condensate still present in the direction of the production well. This further reduces blockage of the critical region. After the rest phase, natural gas and liquid natural gas condensate are produced from the underground gas condensate deposit.

The invention claimed is:
1. A process for producing natural gas and/or natural gas condensate from an underground gas condensate deposit comprising a gas mixture having retrograde condensation characteristics, comprising at least the steps of
 a) sinking at least one production well into the underground gas condensate deposit and producing natural gas or natural gas condensate from the underground gas condensate deposit through the at least one production well,
 b) injecting a free-flowing composition comprising water, urea and at least one metal selected from the group consisting of magnesium and aluminum through the at least one production well into the underground gas condensate deposit,
 c) waiting for a rest phase in which the urea present in the free-flowing composition is hydrolyzed and the at least one metal is oxidized, and
 d) producing natural gas or natural gas condensate from the underground gas condensate deposit through the at least one production well.
2. The process according to claim 1, wherein the underground gas condensate deposit has a deposit temperature in the range from greater than 65 to 200° C.
3. The process according to claim 1, wherein the underground gas condensate deposit has a deposit temperature in the range from 70 to 150° C.
4. The process according to claim 1, wherein the underground gas condensate deposit has a deposit temperature in the range from 80 to 140° C.
5. The process according to claim 1, wherein the underground gas condensate deposit has a deposit temperature in the range from 85 to 120° C.
6. The process according to claim 1, wherein the free-flowing composition comprises
 5 to 70% by weight of urea,
 1 to 30% by weight of at least one metal selected from the group consisting of magnesium and aluminum, and
 20 to 80% by weight of water,
 each based on the total weight of the free-flowing composition.
7. The process according to claim 1, wherein the free-flowing composition comprises
 20 to 40% by weight of urea,
 2 to 10% by weight of at least one metal selected from the group consisting of magnesium and aluminum, and
 30 to 80% by weight of water,
 each based on the total weight of the free-flowing composition.
8. The process according to claim 1, wherein the free-flowing composition comprises at least one metal in particulate form with a particle size in the range from 20 nm to 1000 µm.
9. The process according to claim 8, wherein the particle size of the at least one metal is in the range from 20 nm to 500 µm.
10. The process according to claim 8, wherein the particle size of the at least one metal is in the range from 50 nm to 50 µm.
11. The process according to claim 1, wherein the free-flowing composition has a crystallization temperature below a deposit temperature of the underground gas condensate deposit.

12. The process according to claim 1, wherein the free-flowing composition in step b) is injected at a temperature below a deposit temperature of the gas condensate deposit.

13. The process according to claim 1, wherein the free-flowing composition in process step b) is injected at a free-flowing composition temperature in the range from minus 5 to 40° C.

14. The process according to claim 1, wherein the underground gas condensate deposit prior to performance of process step b) has a critical region at least partly blocked by liquid natural gas condensate.

15. The process according to claim 1, wherein the duration of the rest phase is selected in the range of between 1 to 10 days.

16. The process according to claim 1, wherein the at least one production well is closed during the rest phase in step c).

* * * * *